United States Patent [19]

Hansen et al.

[11] 4,329,148
[45] May 11, 1982

[54] DYE MIXTURES, AND THEIR USE IN DYEING POLYESTERS

[75] Inventors: Guenter Hansen, Ludwigshafen; Wolf-Dieter Kermer, Fussgoenheim; Jochen-Wilfried Stuck, Frankenthal, all of Fed. Rep. of Germany

[73] Assignee: BASF Aktiengesellschaft, Ludwigshafen, Fed. Rep. of Germany

[21] Appl. No.: 222,926

[22] Filed: Jan. 6, 1981

[30] Foreign Application Priority Data

Feb. 8, 1980 [DE] Fed. Rep. of Germany ....... 3004652

[51] Int. Cl.³ .................... C09B 27/00; C09B 45/48; D06P 1/18
[52] U.S. Cl. ........................................................ 8/639
[58] Field of Search ............................................. 8/639

[56] References Cited

U.S. PATENT DOCUMENTS

3,232,693 2/1966 Lange et al. ............................ 8/639
3,342,894 9/1967 Muller .

FOREIGN PATENT DOCUMENTS

2707711 8/1978 Fed. Rep. of Germany .
3823286 6/1960 Japan ..................................... 8/639
48-17618 5/1973 Japan .
1239106 of 0000 United Kingdom .
978544 3/1962 United Kingdom .
1148672 5/1966 United Kingdom .

*Primary Examiner*—Maria Parrish Tungol
*Attorney, Agent, or Firm*—Oblon, Fisher, Spivak, McClelland & Maier

[57] ABSTRACT

Dye mixtures, containing dyes of the formula I

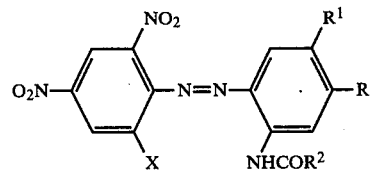

where
X is hydrogen, chlorine or bromine,
$R^1$ is hydrogen, methoxy, ethoxy or phenoxy,
$R^2$ is hydrogen, methyl, ethyl, n-propyl or iso-propyl and
R is

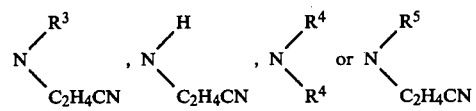

where
$R^3$ is allyl, methallyl, crotonyl, prenyl or benzyl,
$R^4$ is $C_1$-$C_5$-alkyl, allyl, methallyl, crotonyl, prenyl or benzyl and
$R^4$ is $C_1$-$C_5$-alkyl, the mixtures containing not less than 60% of dyes wherein R is

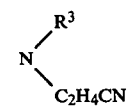

or $NHC_2H_4CN$, from 0 to 40% of one or more dyes wherein R is

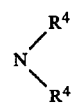

and from 0 to 40% of one or more dyes wherein R is

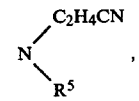

the two last-mentioned components accounting for not less than 5% of the mixture.

The mixtures are exceptionally useful for dyeing polyesters.

3 Claims, No Drawings

DYE MIXTURES, AND THEIR USE IN DYEING POLYESTERS

The present invention relates to dye mixtures, containing dyes of the formula I

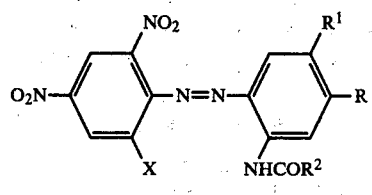

where
X is hydrogen, chlorine or bromine,
$R^1$ is hydrogen, methoxy, ethoxy or phenoxy,
$R^2$ is hydrogen, methyl, ethyl, n-propyl or iso-propyl and
R is

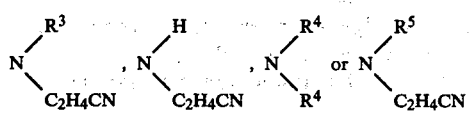

where
$R^3$ is allyl, methallyl, crotonyl, prenyl or benzyl,
$R^4$ is $C_1$–$C_5$-alkyl, allyl, methallyl, crotonyl, prenyl or benzyl and
$R^5$ is $C_1$–$C_5$-alkyl,
the mixtures containing not less than 60% of dyes wherein R is

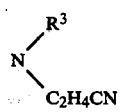

or $NHC_2H_4CN$, from 0 to 40% of one or more dyes wherein R is

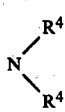

and from 0 to 40% of one or more dyes wherein R is

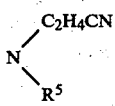

the two last-mentioned components accounting for not less than 5% of the mixture.

The dye mixtures may be prepared by mixing the individual components mechanically, or by carrying out a mixed coupling reaction. Details of the method of preparation may be found in the Examples, where parts and percentages are by weight, unless stated otherwise.

The novel dye mixtures may be used for dyeing synthetic fibers, especially linear polyesters, in dark blue hues. They are distinguished by excellent tinctorial properties, in particular by essentially temperature-independent uptake, good bath exhaustion, good build-up, so that very deep colors can be achieved, and very high tinctorial strength. The fastness characteristics of the dyeings substantially correspond to those of the individual components.

Preferred mixtures contain from 65 to 95% of one or more dyes of the formula I, wherein R is

from 0 to 35% of one or more dyes of the formula I, wherein R is

$R^6$ being $C_1$–$C_5$-alkyl or allyl, and from 0 to 35% of one or more dyes of the formula I, wherein R is

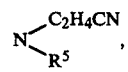

the two last-mentioned components jointly accounting for from 5 to 35% of the mixture.

Dye mixtures of particular industrial importance contain dyes of the formula II

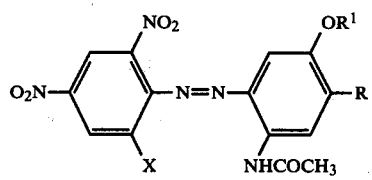

where X and $R^1$ have the stated meanings, the mixture consisting of from 65 to 95% of one or more dye pairs of the formula II, wherein R is

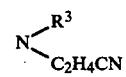

and

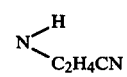

respectively, whilst X and $R^1$ have the same meanings for each member of the pair, and from 5 to 35% of one or more dyes of the formula II, wherein R is

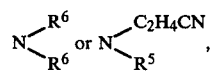

the proportion of dyes of the formula II, wherein R is

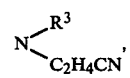

being not less than 40%.

EXAMPLE 1

(a) 262 parts of 6-bromo-2,4-dinitroaniline are introduced into 2,000 parts of concentrated sulfuric acid. 320 parts of nitrosylsulfuric acid (containing 11.5% of $N_2O_3$) are run in slowly at 5°–15° C., whilst stirring and cooling the mixture, and stirring is then continued at 10°–15° C. for not less than 3 hours.

(b) 233 parts of 2-(N-β-cyanoethylamino)-4-acetanisidine are dissolved in 450 parts of warm acetic acid and the solution is added to a mixture of 2,000 parts of water, 300 parts by volume of concentrated hydrochloric acid, 10 parts of amidosulfonic acid and 10 parts of a diisobutylnaphthalene-1-sulfonic acid mixture (isomers in respect of the position of the isobutyl groups). 4,000 parts of ice are added and the diazonium salt solution prepared under (a) is run in slowly at from −5° to +3° C., with thorough stirring. The reaction is completed by adding sodium acetate or sodium formate until the pH is 3. The dye obtained is filtered off at room temperature or above, washed neutral and salt-free with water, and dried. About 460 parts of a violet-black powder of the formula

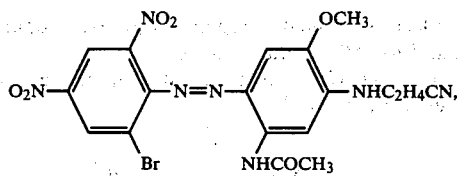

are obtained; this product gives bluish violet dyeings on polyester fibers, the depth of color being poor.

(c) Using a method similar to Example (1b), 273 parts of 2-(N-allyl-N-β-cyanoethyl-amino)-4-acetanisidine give 495 parts of the dye of the formula

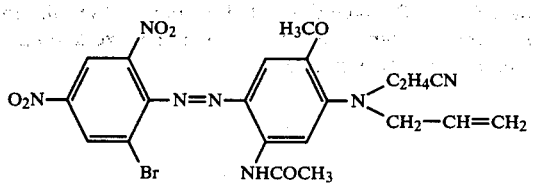

This dye gives blue dyeings, which are very lightfast, washfast, and fast to thermofixing and perspiration, on polyester fibers. However, the build-up of the dye is poor, and the depth of color is very dependent on the temperature in the dyebath in the range from 120° to 140° C.

(d) Using a method similar to Example 1(b), 236 parts of 2-diethylamino-4-acetanisidine give 365 parts of the dye of the formula

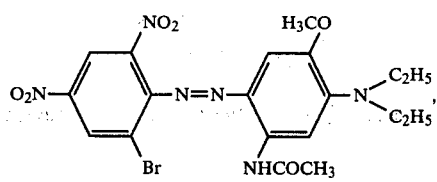

which produces greenish blue hues on polyester fibers.

(e) A polyester fabric is dyed by the HT method, using a dye mixture which consists of 40 parts of the dye prepared under 1(b), 50 parts of the dye prepared under 1(c) and 10 parts of the dye prepared under 1(d). Advantageously, the dye mixture is employed as a finely dispersed formulation containing a dispersant.

Deep and level navy dyeings with good fastness characteristics are obtained. Within the HT range of 125°–135° C., the depth of color is only slightly temperature-dependent. Even when used for deep navy dyeings, the dye mixture shows good bath exhaustion and good build-up.

EXAMPLE 2

262 parts of 6-bromo-2,4-dinitro-aniline are diazotized as described under 1(a) and the product is coupled, similarly to 1(b), with a mixture of 24.4 parts of 2-diethylamino-4-acetanisidine, 96.9 parts of 2-(N-β-cyanoethyl-amino)-4-acetanisidine and 131.6 parts of 2-(N-allyl-N-β-cyanoethyl-amino)-4-acetanisidine.

A mixed dye, which corresponds, in chemical composition, to the mechanical mixture prepared in Example 1(e) is obtained.

The mixed dye is converted to a dye formulation by conventional methods, and the formulation is used to dye polyesters. The results achieved are the same as in Example 1(e).

EXAMPLE 3

A polyester fabric is dyed with a mixture of 70 parts of the dye of Example 1(c), 15 parts of the dye of Example 1(b) and 15 parts of the dye of the formula

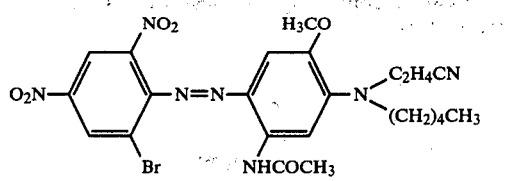

(German Laid-Open Application DOS No. 2,707,711, Example 5). Deep, level, very fast navy dyeings are obtained. The mixture shows good build-up even when used for deep navy dyeings.

Temperature fluctuations or pH fluctuations in the dyebath during the HT process have little influence on the hue and depth of color.

EXAMPLE 4

217.5 parts of 6-chloro-2,4-dinitro-aniline are diazotized similarly to Example 1(a) and coupled, similarly to Example 1(b), with a mixture of 25.4 parts of 2-diethylamino-4-acetanisidine, 51.9 parts of 2-(N-β-cyanoethyl-amino)-4-acetphenetidine, 167 parts of 2-(N-allyl-N-β-cyano-ethyl-amino)-4-acetphenetidine and 26.6 parts of 2-(N-ethyl-N-β-cyanoethyl-amino)-4-acetanisidine. 445 parts of a dark dye powder are obtained; the product gives navy dyeings, which are very lightfast, washfast, and fast to perspiration and thermofixing, on polyester fibers. The dye mixture has good tinctorial properties, in particular good build-up and little temperature-dependence of dye uptake in the range from 125° to 135° C.

The dye mixtures listed in the Table which follows are obtained similarly to Examples 1 to 4 and show similar tinctorial properties.

| Example | % | X | R¹ | R² | R | Product prepared similarly to Example |
|---|---|---|---|---|---|---|
| 5 | 40 | Cl | CH₃ | C₂H₅ | NH—C₂H₄CN | 1 |
| | 40 | Cl | CH₃ | C₂H₅ | N(C₂H₄CN)(CH₂—CH=CH₂) | (mechanical mixture) |
| | 20 | Cl | CH₃ | C₂H₅ | N(CH₃)₂ | |
| 6 | 30 | Br | C₂H₅ | H | NH—C₂H₄CN | 2 |
| | 40 | Br | C₂H₅ | CH₃ | N(C₂H₄CN)(CH₂—CH=C(CH₃)₂) | (mixed coupling) |
| | 30 | Br | C₂H₅ | H | N(C₄H₉)₂ | |
| 7 | 30 | Cl | CH₃ | CH₃ | NH—C₂H₄CN | 1 |
| | 45 | Br | CH₃ | CH₃ | N(C₂H₄CN)(CH₂—CH=CH₂) | |
| | 25 | Br | CH₃ | CH₃ | N(CH₂—CH=CH₂)₂ | |
| 8 | 50 | Cl | C₂H₅ | CH₃ | NH—C₂H₄CN | 1 |
| | 40 | Cl | C₂H₅ | CH₃ | N(C₂H₄CN)(CH₂—C₆H₅) | |
| | 10 | Br | C₂H₅ | CH₃ | N(C₂H₅)₂ | |
| 9 | 20 | Br | CH₃ | CH₃ | NH—C₂H₄CN | 1 |
| | 60 | Cl | CH₃ | CH₃ | N(C₂H₄CN)(CH₂—CH=CH—CH₃) | |
| | 20 | Cl | CH₃ | CH₃ | N(CH₂—CH=CH₂)₂ | |
| 10 | 45 | Cl | CH₃ | CH₃ | NH—C₂H₄CN | 2 |
| | 40 | Cl | CH₃ | CH₃ | N(C₂H₄CN)(CH₂—CH=CH₂) | |
| | 15 | Cl | CH₃ | CH₃ | N(C₂H₅)₂ | |
| 11 | 20 | Br | CH₃ | CH₃ | NH—C₂H₄CN | 2 |
| | 65 | Br | CH₃ | CH₃ | N(C₂H₄CN)(CH₂—C₆H₅) | |
| | 15 | Br | CH₃ | CH₃ | N(C₂H₄CN)(CH₃) | |
| 12 | 30 | Cl | CH₃ | CH₃ | NH—C₂H₄CN | 2 |
| | 40 | Cl | CH₃ | CH₃ | N(C₂H₄CN)(CH₂—CH=CH₂) | |
| | 20 | Cl | CH₃ | CH₃ | N(C₂H₄CN)(CH₂—CH(CH₃)—CH₂CH₃) | |
| | 10 | Cl | CH₃ | CH₃ | N(C₂H₅)₂ | |
| 13 | 20 | Br | CH₃ | CH₃ | NH—C₂H₄CN | 1 |
| | 40 | Cl | CH₃ | CH₃ | N(C₂H₄CN)(CH₂—CH=C(CH₃)₂) | |

-continued

| Example | % | X | R$^1$ | R$^2$ | R | Product prepared similarly to Example |
|---|---|---|---|---|---|---|
| | 30 | Cl | CH$_3$ | CH$_3$ | N(C$_2$H$_4$CN)(CH$_2$—C$_6$H$_5$) | |
| | 10 | Br | CH$_3$ | CH$_3$ | N(C$_2$H$_5$)$_2$ | |
| 14 | 10 | Cl | CH$_3$ | CH$_2$ | NHC$_2$H$_4$CN | |
| | 80 | Cl | CH$_3$ | CH$_3$ | N(C$_2$H$_4$CN)(CH$_2$—C(CH$_3$)=CH$_2$) | mixed coupling |
| | 10 | Br | CH$_3$ | CH$_3$ | N(C$_2$H$_5$)$_2$ | Third component admixed mechanically |
| 15 | 10 | Br | CH$_3$ | CH$_3$ | NHC$_2$H$_4$CN | 1 |
| | 80 | Br | CH$_3$ | CH$_3$ | N(C$_2$H$_4$CN)(CH$_2$—CH=CH$_2$) | |
| | 10 | Br | CH$_3$ | CH$_3$ | N(C$_2$H$_5$)$_2$ | |
| 16 | 10 | Cl | CH$_3$ | CH$_3$ | NHC$_2$H$_4$CN | 2 |
| | 75 | Cl | CH$_3$ | CH$_3$ | N(C$_2$H$_4$CN)(CH$_2$—CH=CH$_2$) | |
| | 15 | Cl | CH$_3$ | CH$_3$ | N(C$_2$H$_4$CN)((CH$_2$)$_4$CH$_3$) | |

We claim:
1. A dye mixture, containing dyes of the formula I

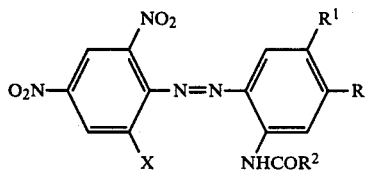

where
X is hydrogen, chlorine or bromine,
R$^1$ is hydrogen, methoxy, ethoxy or phenoxy,
R$^2$ is hydrogen, methyl, ethyl, n-propyl or iso-propyl and
R is

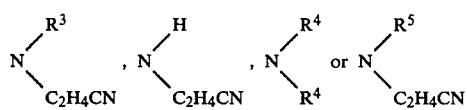

where
R$^3$ is allyl, methallyl, crotonyl, prenyl or benzyl,
R$^4$ is C$_1$-C$_5$-alkyl, allyl, methallyl, crotonyl, prenyl or benzyl and
R$^5$ is C$_1$-C$_5$-alkyl,
the mixture containing not less than 60% of dyes wherein R is

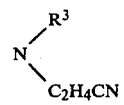

or NHC$_2$H$_4$CN, from 0 to 40% of one or more dyes wherein R is

and from 0 to 40% of one or more dyes wherein R is

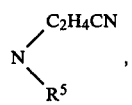

the two last-mentioned components accounting for not less than 5% of the mixture.

2. A dye mixture as claimed in claim 1, which contains from 65 to 95% of one or more dyes of the formula I, wherein R is

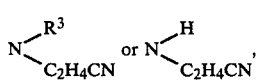

from 0 to 35% of one or more dyes of the formula I, wherein R is

$R^6$ being $C_1$–$C_5$-alkyl or allyl, and from 0 to 35% of one or more dyes of the formula I, wherein R is
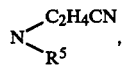
the two last-mentioned components together accounting for from 5 to 35% of the mixture.
3. The dye mixture as claimed in claim 1, containing 40 parts of a dye of the formula:
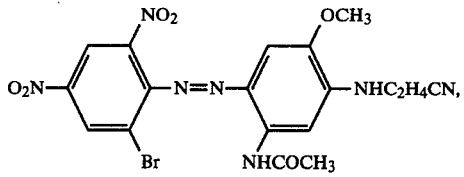
50 parts of a dye of the formula:
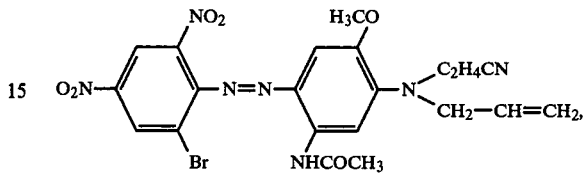
and 10 parts of a dye of the formula:
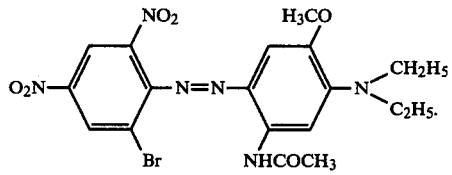
* * * * *